UNITED STATES PATENT OFFICE.

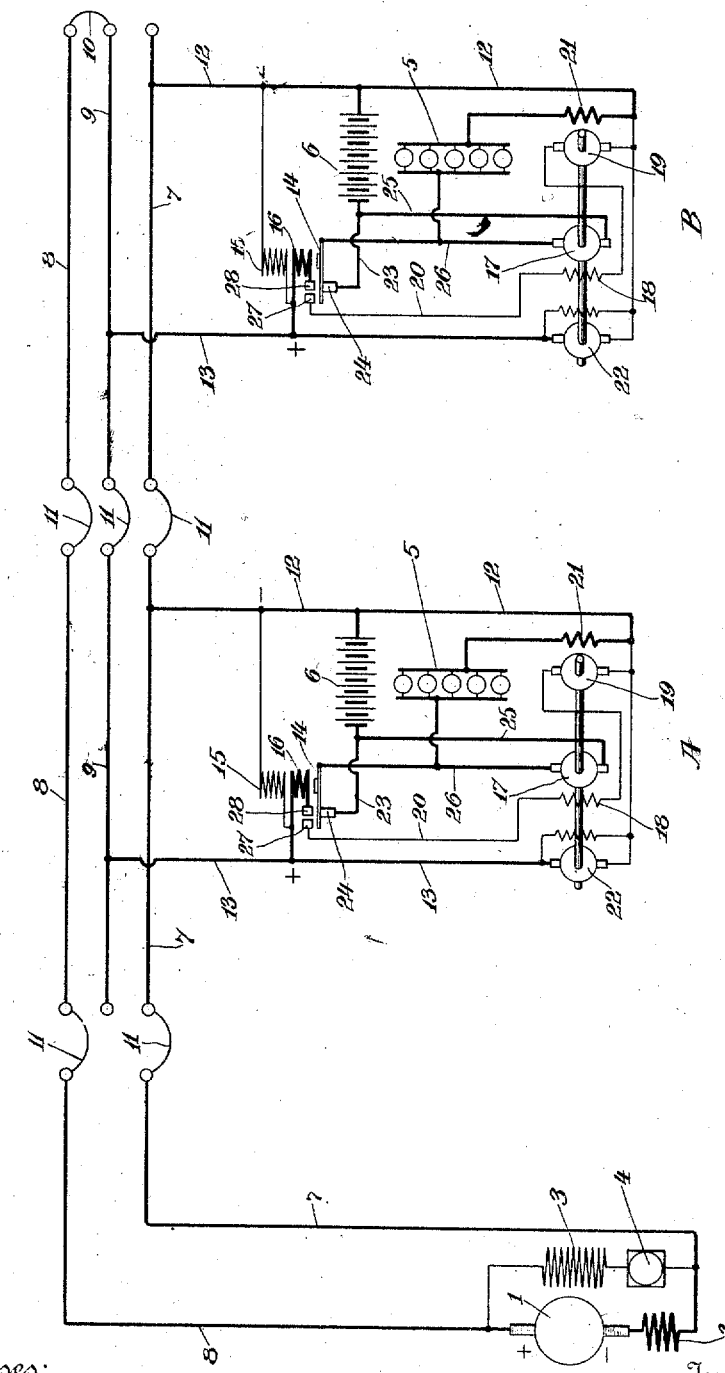

WILLIAM A. TURBAYNE, OF LANCASTER, NEW YORK, ASSIGNOR TO GOULD COUPLER COMPANY, A CORPORATION OF NEW YORK.

ELECTRICAL SYSTEM OF DISTRIBUTION.

987,194.  Specification of Letters Patent.  Patented Mar. 21, 1911.

Application filed February 24, 1909. Serial No. 479,756.

*To all whom it may concern:*

Be it known that I, WILLIAM A. TURBAYNE, a citizen of the United States, and a resident of Lancaster, in the county of Erie, State of New York, have invented certain new and useful Improvements in Electrical Systems of Distribution, of which the following is a specification.

My invention relates to electrical systems of distribution and is more especially directed toward improvements in systems of distribution especially adapted for train lighting.

One object of my invention is to provide an arrangement in which each train unit has thereon a work circuit and storage battery and in which regulating apparatus is provided on each train unit for controlling the charge of the battery.

A further object of my invention is to provide an arrangement of this class whereby the batteries of the various train units may be charged at one voltage and the work circuits fed at another voltage, and yet only three conductors are required, extending throughout the train through the various train units from the generator.

Further objects, features and advantages will more clearly appear from the detailed description given below taken in connection with the accompanying drawing which diagrammatically shows a train lighting system embodying one form of my improvements.

Referring to the drawing, 1 indicates a main generator provided with a series field 2 and a shunt field 3. The generator 1 may be located upon one of the train units, for instance either the locomotive or baggage car. A regulating resistance 4 may be inserted in series with the shunt field 3 for the purpose of adjusting the same. Two train units which are desired to be lighted or supplied with electrical energy for other purposes are represented by A and B. As shown, each of these train units is provided with a lamp or work circuit 5 and a storage battery 6. Extending throughout the various train units is a negative conductor 7 which is connected to the negative side of the generator 1. Also extending throughout the various train units is a positive conductor 8 which is connected to the positive side of the generator 1, at one end and at its other end is connected to the return conductor 9 by a loop 10 the conductor 9 extending through the various train units A and B. The conductors 7, 8, and 9 are connected between each unit by means of connectors 11. The negative side of each of the batteries 6 and work circuits 5 is connected to the negative conductor 7 by means of wires 12. The positive sides of the batteries 6, 6, are connected to the positive return or loop conductor 9 by means of wires 13. A switch 14 is arranged to open the circuit through each wire 13. The switch 14 is acted upon by an electro-magnet coil 15 connected across the wires 12 and 13, so that it is responsive to variations in the generator voltage. A coil 16 in series with the wire 13 is also arranged to act magnetically upon the switch 14.

17, 17 represent boosters arranged to be thrown in series with the batteries 6 for the purpose of regulating the charge of the same. Each booster 17 is provided with a field coil 18 in series with a counter-electromotive force machine 19 arranged to be connected across the wires 12 and 13 by means of a circuit 20. The exciter or counter-electromotive force machine 19 is provided with a field coil 21 which is in series with the work circuit 5 so that it is subject to fluctuations of that portion of the load furnished to the lamps or work circuit.

22, 22 represent shunt motors for driving the various exciters and boosters 17 and 19; these motors being also connected across the wires 12 and 13.

The positive end of each battery is provided with two leads, one represented by 23 leads directly to contact terminal 24, the other lead 25 leads to the armature of the booster 17 and thence by lead 26 to the arm of switch 14. The work circuits 5 are connected directly across the wire 12 and lead 26 with the field coil 21 of each regulating machine in series therewith.

The arm 14 of the various switches is arranged to contact with the terminal 24 when in its lower position and when in its upper position is arranged to contact with contact terminals 27 and 28. This action electrically connects the contact terminals 27 and 28 together and also connects the contact terminal 28 to the lead 26 through the switch member 14.

In operation, when the main generator is at rest the parts occupy the positions as shown in the drawing. When the generator is started up and after its voltage has risen to a predetermined value the strength of magnet coil 15 becomes sufficient to raise the armature of switch 14 so that the battery 6 is connected across the wires or conductors 12 and 13 with the booster 17 in series therewith. The magnet coil 16 is also connected in series therewith at the same time, and the circuit 20, including the counter-machine 19, is by the same action connected across the feeding conductors or wires 12 and 13. The work circuits 5 are at the same time connected across the conductors 12 and 26 and thus fed from the generator 1 in parallel with the batteries 6 and the extra voltage necessary to cause the batteries to be charged is supplied by the boosters 17. If there is full load upon the work circuit 5 the strength of field coil 21 is such that the counter-machine 19 produces a voltage exactly equal to but opposite in direction to that applied to the circuit 20 by the generator 1. Therefore, no current will flow in the field coil 18 of the booster and the booster will generate no voltage and the battery will be allowed to float across the line. When the load on the work circuit 5 decreases and electromotive forces in circuit 20 become unbalanced a current is sent through the field coil 18 of the booster in a direction to cause the booster to produce an electromotive force in a direction to cause the battery to be charged, thus tending to maintain the load on each of the train units constant. When the main generator is being shut down, at a certain point, the voltage of the batteries 6 will be greater than that of the generator and a reverse current will flow through the series coil 16 of the switch 14, which coil has hitherto aided the coil 15 in attracting the magnet armature. This reverse current in coils 16 will oppose that of coils 15, thereby greatly decreasing the attractive action of these magnet coils allowing the switch members 14 to drop under gravity or other force, so that the positive side of the generator is entirely disconnected from the batteries and work circuits on the various units. Upon dropping to its lower position the switch member 14 connects each battery 6 directly across the work circuit 5 by connecting the conductors 23 directly to the leads 26, so that each battery 6 will feed its work circuit 5.

By thus providing a booster arrangement on each train unit it is unnecessary to provide an extra boosting or charging conductor extending throughout the various units of the train. It will further be apparent that upon the shutting down of the generator the various train conductors are rendered dead and no danger will result either to persons or to the apparatus itself by the handling of these conductors. By regulating each booster responsive to the current in the work circuit on the unit the load on each unit which is supplied by the main generator is maintained substantially constant. Therefore, after the number of units have been determined the load on the main generator is maintained substantially constant.

Although I have described my invention as applied to one particular system it will be apparent that my improvements are applicable to many other systems and arrangements, and, I, therefore, do not desire to be limited to the actual details shown and described but Having fully and clearly described my invention what I claim as new and desire to secure by Letters Patent, is:

1. In an electrical system of distribution, a plurality of train units, a work circuit and storage apparatus on each unit, positive and negative conductors extending through the various train units for connecting each work circuit and storage apparatus to the generator, means on each unit for regulating the action of the storage apparatus and means for causing said first mentioned means to be inoperative when the storage apparatus is discharging.

2. In an electrical system of distribution, a generator, a plurality of train units, a work circuit and storage battery and its circuit on each unit, positive and negative conductors extending throughout the various train units for connecting the work circuits and battery circuits to the generator, a source of variable electromotive force in the battery circuit on each unit to vary the battery action and means for preventing the batteries from feeding the generator when they discharge.

3. In an electrical system of distribution, a generator, a plurality of train units, a work circuit and storage battery and its circuit on each unit, positive and negative conductors extending throughout the various train units for connecting the work circuits and battery circuits to the generator, a booster on each unit for causing the battery to charge and means for rendering the boosters inoperative when the batteries discharge.

4. In an electrical system of distribution, a generator, a plurality of train units, a work circuit and storage battery and its circuit on each unit, positive and negative conductors extending throughout the various train units for connecting the work circuits and battery circuits to the generator, means on each unit for controlling the division of load thereon between the battery thereon and the generator and means for rendering said means inoperative when the battery discharges.

5. In an electrical system of distribution, a generator, a plurality of train units, a work circuit and storage battery and its circuit on each unit, positive and negative conductors extending throughout the various train units for connecting the work circuits and battery circuits to the generator, means on each unit for controlling the division of load thereon between the battery thereon and the generator responsive to fluctuations in said load and means for preventing the batteries from feeding the generator when they discharge.

6. In an electrical system of distribution, a generator, a plurality of train units, a work circuit and storage battery and its circuit on each unit, positive and negative conductors extending throughout the various train units for connecting the work circuits and battery circuits to the generator, a booster on each unit in series with the battery for controlling the charge thereof, said booster having a field coil connected to be responsive to changes of load on the work circuit of the unit and means for preventing the batteries from feeding the generator when they discharge.

7. In an electrical system of distribution, a generator, a plurality of train units, a work circuit and storage battery and its circuit on each unit, positive and negative conductors extending throughout the various train units for connecting the work circuits and battery circuits to the generator, a booster on each unit in series with the battery for controlling the charge thereof, an exciter for the booster, said exciter being connected across a substantially constant source of electromotive force and opposed thereto, and having a field coil responsive to load changes on the work circuit and means for preventing the batteries from feeding the generator when they discharge.

8. In an electrical system of distribution, a generator, a plurality of train units, a work circuit and storage battery and its circuit on each unit, positive and negative conductors extending throughout the various train units for connecting the work circuits and battery circuits to the generator, a booster on each unit in series with the battery for controlling the charge thereof, an exciter for the booster, said exciter having a field coil responsive to load changes on the work circuit of the unit and means for short-circuiting the boosters when the batteries discharge.

9. In an electrical system of distribution, a main generator, a plurality of train units, a work circuit and storage apparatus on each unit, positive and negative conductors extending through the various units to connect the work circuits with the generator, means on each unit for controlling the charge of the storage apparatus and a switch on each unit for wholly disconnecting the storage apparatus and work circuit thereon from one side of the generator and short-circuiting said means.

10. In an electrical system of distribution, a generator, a plurality of train units, a work circuit and storage battery on each unit, conductors extending through the various units for connecting the generator with the batteries and work circuits, a booster for each battery, and means on each unit for disconnecting the battery from the generator and connecting the same across the work circuit.

11. In an electrical system of distribution, a generator, a plurality of train units, a work circuit and storage battery on each unit, conductors extending through the various units for connecting the generator with the batteries and work circuits, a booster for each battery, and a switch on each unit for disconnecting the battery from the generator and connecting the same across the work circuit responsive to certain variations from a predetermined value of generator voltage.

12. In an electrical system of distribution, a generator, a plurality of train units, a work circuit and storage battery on each unit, conductors extending through the various units for connecting the generator with the batteries and work circuits, a booster for each battery for controlling the charge of the same responsive to variations in the load on the work circuit, and a switch on each unit for disconnecting the battery from the generator and connecting the same across the work circuit responsive to certain variations from a predetermined value of generator voltage.

13. In an electrical system of distribution, a generator, a plurality of train units, a battery and work circuit on each unit, a conductor extending through the various units and connecting one side of the generator with one side of the work circuits, another conductor extending from the other side of the generator through the various train units and having a return portion to form a loop conductor, said return portion being connected to the other side of said work circuits, a booster on each unit for controlling the charge of the battery thereon and means for rendering the boosters inoperative when the batteries discharge.

14. In an electrical system of distribution, a generator, a plurality of train units, a battery and work circuit on each unit, a plurality of train conductors extending through the various units and arranged to operatively connect the generator with the various work circuits and batteries, one of said conductors being a loop conductor, a booster on each unit for regulating the charge of the battery thereon responsive to variations in the load on the work circuit and means for preventing the batteries from feeding the generator when they discharge.

15. In an electrical system of distribution, a generator, a plurality of train units, a battery and work circuit on each unit, a plurality of train conductors extending through the various units and arranged to operatively connect the generator with the various work circuits and batteries, one of said conductors being a loop conductor, a booster on each unit, and a switch arranged to connect the booster in series with the battery responsive to variations from a predetermined value of generator voltage.

16. In an electrical system of distribution, a generator, a plurality of train units, a battery and work circuit on each unit, a plurality of train conductors extending through the various units and arranged to operatively connect the generator with the various work circuits and batteries, one of said conductors being a loop conductor, a booster on each unit for controlling the charge of the battery responsive to variations in work circuit load thereon, a switch arranged to connect the booster in series with the battery responsive to variations from a predetermined value of generator voltage, a counter-electromotive force machine on each unit for regulating the booster field current, and a motor on each unit for driving the booster and counter-electromotive force machine thereon.

17. In an electrical system of distribution, a source of electrical energy, a plurality of train units, a work circuit and storage battery on each unit, conductors extending through the the various units for connecting the source with the batteries and work circuits, a booster for each battery and a switch for regulating the connection of each booster responsive to changes in the electrical condition of the system.

18. In an electrical system of distribution, a source of electrical energy, a plurality of train units, a work circuit and storage battery on each unit, conductors extending through the various units for connecting the source with the batteries and work circuits, a booster for each battery and a switch for regulating the connection of each battery responsive to changes in the electrical condition of the system.

19. In an electrical system of distribution, a source of electrical energy, a plurality of train units, a work circuit and storage battery on each unit, conductors extending through the various units for connecting the same with the batteries and work circuits, a booster for each battery and a switch for regulating the connection of each work circuit responsive to changes in the electrical condition of the system.

20. In an electrical system of distribution, a source of electrical energy, a plurality of train units, a work circuit and storage battery on each unit, conductors extending through the various units for connecting the batteries and work circuits to said source, means on each unit for controlling the charge of the battery thereon, said means including a source of variable electromotive force, and switching means on each unit for regulating the connections thereon responsive to variations in the voltage of said first mentioned source.

21. In an electrical system of distribution, a source of electrical energy, a plurality of train units, a work circuit and battery on each unit, conductors extending to the various units for connecting the source with the batteries and work circuits to supply the same, a booster for each battery and means for disconnecting the source responsive to a certain decrease in voltage thereof.

22. In an electrical system of distribution, a source of electrical energy, a plurality of train units, a work circuit and storage battery on each unit, conductors extending through the various units for connecting the batteries and work circuits to said source, means on each unit for controlling the charge of the battery thereon, said means including a source of variable electromotive force, and means for disconnecting said first mentioned source responsive to a decrease in voltage thereof.

In testimony whereof, I have signed my name to this specification, in the presence of two subscribing witnesses.

WILLIAM A. TURBAYNE.

Witnesses:
    THOS. DOBBINS,
    W. H. PATTENDEN.